United States Patent [19]

Okumura et al.

[11] Patent Number: 4,698,195
[45] Date of Patent: Oct. 6, 1987

[54] PROCESS FOR PREPARING BIAXIALLY DRAWN POLYAMIDE FILMS

[75] Inventors: Tsuguo Okumura, Tsukuba; Naomichi Yamagishi, Inashiki; Kazuharu Abe; Masayoshi Sugiyama, both of Tsuchiura; Kenji Mori, Inashiki, all of Japan

[73] Assignee: Mitsubishi Monsanto Chemical Co., Tokyo, Japan

[21] Appl. No.: 766,632

[22] Filed: Aug. 16, 1985

[51] Int. Cl.$^4$ ............................................. B29C 55/14
[52] U.S. Cl. .............................. 264/235.8; 264/210.7; 264/210.2
[58] Field of Search ............... 264/210.7, 235.8, 290.2, 264/DIG. 73; 26/73

[56] References Cited

U.S. PATENT DOCUMENTS 3,172,150  3/1965  Dornier ..................................... 26/72
3,946,089  3/1976  Furukawa et al. ........... 264/235.8 X
4,120,928  10/1978  Furukawa et al. ........... 264/290.2 X Primary Examiner—Jeffery Thurlow
Assistant Examiner—Leo B Tentoni
Attorney, Agent, or Firm—Burgess, Ryan and Wayne

[57] ABSTRACT

Biaxially drawn polyamide films having an excellent levelness are prepared as follows. A substantially unoriented polyamide film is heated at 45°–65° C., and then drawn in the longitudinal direction at a deformation rate of at least 10,000%/min. and a draw ratio of 2.7–3.5 by a roll stretcher. The drawn film is immediately transferred to the lateral drawing position at 45°–60° C. within a time (t): $t = e^{(3.9 - 0.053 T_1)}$ where $e$ = the base of natural logarithm and $T_1$ = film temperature during this period of time (t), which is 45°–60° C. The thickness profile of the film at the starting position of lateral drawing is gradually reduced from the side end portions toward the central portion of the width so that the film thickness at the central portion is 75–90% of the film thickness at the side end portions. The film is drawn in the lateral direction at an average deformation rate of 2,000–10,000%/min. and a draw ratio of 3–5 by a tenter type stretcher in such a manner that, until the mechanically set draw ratio between respective tenter clips exceeds 1.4 times the original distance, the film is expanded at an angle of up to 6° with respect to the travelling direction at a tenter clip temperature $T_2$ ($T_2 < T_1$). The film temperature is elevated stepwise in the lateral drawing and the film temperature at the termination position of lateral drawing is 70°–100° C.

5 Claims, 10 Drawing Figures

PROCESS FOR PREPARING BIAXIALLY DRAWN POLYAMIDE FILMS

BACKGROUND OF THE INVENTION

1. Field of the Invention

The present invention relates a process for the preparation of a biaxially drawn polyamide film. More particularly, it relates to an improvement in the process for the preparation of a biaxially drawn polyamide film comprising first drawing a polyamide film in the longitudinal direction and then drawing the film in the lateral direction while holding the film by a tenter method, whereby a biaxially drawn polyamide film having an excellent flatness is obtained.

2. Description of the Related Art

A biaxially drawn polyamide film has excellent toughness, heat resistance, cold resistance, transparency, printability, and chemical resistance and is characterized in that almost no pinholes are formed, and thus this film is widely used as a base film for packaging foods and the like. For example, for the formation of a food-packaging pouch, a base film is ordinarily subjected to printing, lamination, forming into a bag, food filling, and then heat sealing. In this case, the flatness of the base film has a great influence on the processing speed and yield at the steps of printing, lamination, and forming into a bag. Namely, if a portion of the base film is slack, a pitch shear is generated at the printing step or wrinkling is caused at the lamination or bag-forming step, and it is impossible to increase the processing speed. Accordingly, it is eagerly desired to improve the levelness in the base film, especially to moderate the "uneven tightening phenomenon".

By the term "uneven tightening phenomenon" is meant a phenomenon in which a part of the film in the lateral direction is shorter than the other part with respect to the longitudinal direction of the film. This phenomenon is confirmed by the difference of elongation when a certain tension is imposed on a biaxially drawn film and this tension then removed.

This "uneven tightening phenomenon" will now be described with reference to FIG. 1. In FIG. 1, a film having been cut in the longitudinal direction into a length (for example, 3 meters) larger than the distance (for example, 2 meters) between base lines 2 and 3 is placed on a flat table 1, and one end of the film is secured to the table by an adhesive tape 4. A certain load, for example, a load of 20 grams per cm of the width, is imposed on the other end of the film to stretch the film, and a bench mark 6 corresponding to the base line 3 is drawn on the film. Then the load is removed, and cut lines 5 are formed on the film in the longitudinal direction to cut the film into strips having a constant width (for example, 3 cm). Then a certain load, for example, a load of 60 grams, is imposed on the free end of each strip. When the base line 3 on the table 1 is compared with the bench mark 6 on th strip, a pitch shear is observed between them. It is considered that this phenomenon is due to the fact that the thickness of the film is not uniform in the lateral direction and the flatness is poor.

More specifically, in the production of a biaxially drawn polyamide film by a sequential biaxial drawing method, because of the influence of the tenter clip holding both side ends of the film in the lateral direction and the influence of the necking-occurring position at the lateral drawing, it is very difficult to obtain a film having excellent flatness and uniform thickness over the entire width of the film.

If the film is thin at specific portions, at the heat-setting and cooling steps subsequent to the lateral drawing, these portions undergo crystallization, relaxation or strain different from that undergone by the other portions. It is considered that this results in the occurrence of the uneven tightening phenomenon.

Various proposals have been made to prepare a drawn film having excellent flatness while moderating the uneven tightening phenomenon in the drawn film. For example, Japanese Unexamined Patent Publication No. 52-126476 proposes a process for improving the flatness of a film by imposing a high tension on the film between the steps of the longitudinal drawing and lateral drawing of the film or after the heat-setting step subsequent to the lateral drawing. However, if only a high tension is imposed on a film according to this process, the effect of improving the flatness is not sufficient. A satisfactory improvement is attained if this application of a high tension is combined with heat relaxation conducted after application of a high tension. Therefore, the process is economically disadvantageous in that a heat-relaxing apparatus is necessary.

Japanese Unexamined Patent Publication No. 58-55221 discloses a process for improving the flatness of a biaxially drawn and heat-set film by treating the film in steam maintained at a temperature of 90° to 150° C. under a certain tension. However, this process has a problem in that since an apparatus for the steam treatment of the film and the step of drying the film after the steam treatment are necessary, the manufacturing cost is high.

SUMMARY OF THE INVENTION

In view of the foregoing background, it is a primary object of the present invention to provide an industrially advantageous process for preparing a biaxially drawn polyamide film having excellent levelness.

In accordance with the present invention, there is provided a process for the preparation of biaxially drawn polyamide films, which comprises drawing a substantially amorphous unoriented polyamide film first in the longitudinal direction and then in the lateral direction to form a biaxially drawn polyamide film. In this process, the substantially unoriented polyamide film is heated at a temperature of 45° C. to 65° C., and the heated polyamide film is drawn in the longitudinal direction at a rate of deformation of at least 10,000%/min and a draw ratio of 2.7 to 3.5 by a roll type longitudinal drawing method. The longitudinally drawn film is immediately transferred to the position of starting the drawing in the lateral direction at a temperature adjusted to 45° C. to 60° C. within a time represented by the following formula (I):

$$t = e^{(3.9 - 0.053 T_1)} \quad (I)$$

wherein
e represents the base of the natural logarithm, t represents the time (seconds) between the point of termination of the drawing in the longitudinal direction and the point of starting of the drawing in the lateral direction, and $T_1$ represents the temperature of the film during this period of time, which is selected to be within the range of from 45° C. to 60° C., and the thickness profile of the film at the position of starting the drawing in the lateral direction is gradually reduced from the side end portions (tenter clip holding portions) with respect to the lateral direction toward the central portion with respect to the lateral direction so that the thickness of the film at the central portion with respect to the lateral direction is 75 to 90% of the thickness of the film at the side end portions with respect to the lateral direction. The film is drawn in the lateral direction at an average rate of deformation of 2,000 to 10,000%/min and a draw ratio of 3 to 5 by a tenter type lateral drawing method in such a manner that until the mechanically set draw ratio between respective tenter clips exceeds 1.4 times the original distance, the film is expanded at an angle of up to 6° with respect to the central line in the lateral direction of the film at a tenter clip temperature $T_2$ satisfying the conditions of $T_2 < T_1$, the film temperature is elevated stepwise from the position of starting the drawing in the lateral direction, and the film temperature at the position of termination of the drawing in the lateral direction is within the range of from 70° C. to 100° C.

DESCRIPTION OF THE PREFERRED EMBODIMENTS

Figure 1:
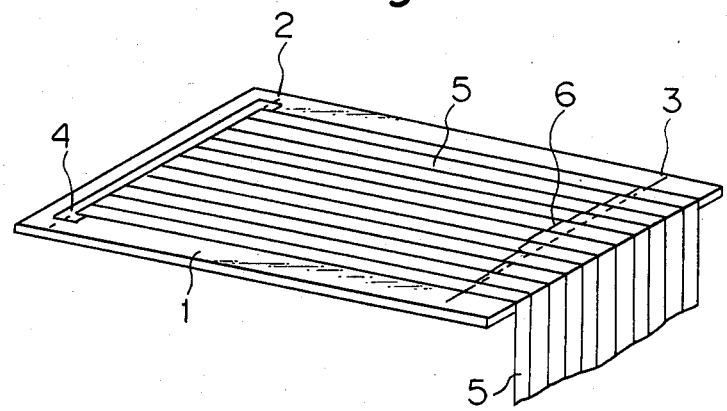
FIG. 1 is a perspective view illustrating the "uneven tightening phenomenon"

By the term "polyamide" used in the present invention are meant a homopolymer of ε-caprolactam, a copolymer comprising ε-caprolactam as the main component and, 2 to 10 mole % of other compound copolymerizable therewith, and a mixture of this homopolymer and/or this copolymer with 5 to 20% by weight of a polymer compatible therewith.

As the compound copolymerizable with ε-caprolactam, aliphatic and aromatic diamines and aliphatic and aromatic dicarboxylic acids can be mentioned. As specific examples of the diamine, there can be mentioned ethylenediamine, tetramethylenediamine, pentamethylenediamide, hexamethylenediamine, octamethylenediamine, decamethylenediamine, m-xylenediamine, and p-xylenediamine. As the dicarboxylic acid, there can be mentioned adipic acid, sebacic acid, cork acid, glutaric acid, azelaic acid, β-methyladipic acid, terephthalic acid, isophthalic acid, decamethylenedicarboxylic acid, dodecamethylenedicarboxylic acid, and pimelic acid. The polymer that can be mixed with the homopolymer and/or copolymer includes a copolymer of a diamine as described above with a dicarboxylic acid as described above.

Various additives such as a lubricant, an antistatic agent, a blocking preventing agent, a stabilizer, a dye, a pigment and an inorganic fine particle may be added to the polyamide, in so far as no adverse affects occur to the properties of the formed film.

According to the process of the present invention, a substantially amorphous polyamide film (hereinafter referred to as "undrawn film") is used. The undrawn polyamide film is prepared, for example, by melt-extruding a polyamide in the form of a molten film from a T-die by using an extruder and quenching the extruded molten film on a casting roll maintained at a temperature not higher than 40° C., preferably not higher than 35° C., but higher than the moisture condensation temperature, according to a known casting method, such as an air knife casting method, an electrostatic pinning method or a vacuum chamber method.

According to the process of the present invention, the undrawn film is first drawn in the longitudinal direction (hereinafter reference to as "longitudinal drawing") by a roll type longitudinal drawing method. By the term "roll type longitudinal method" is meant the longitudinal drawing method using a roll type drawing machine. A known roll type high-speed drawing machine may be used in the present invention.

Prior to the longitudinal drawing, the undrawn film is heated to a temperature of 45° C. to 65° C. by a preheating roll maintained at a predetermined temperature. If the temperature of the undrawn film is lower than 45° C., longitudinal drawing unevenness is readily caused in the longitudinal drawn film. If the film temperature is higher than 65° C., the film tends to stick to the roll surface and, in this case, longitudinal drawing unevenness is readily caused in the longitudinally drawn film. Furthermore, in the latter case, a strong hydrogen bond having a directionality in the drawn direction is generated, and at the subsequent drawing in the lateral direction (hereinafter referred to as "lateral drawing"), lateral drawing unevenness is caused or an undrawn portion (see FIG. 10) is left and the film is readily torn.

At the longitudinal drawing step, it is necessary to adopt drawing conditions of a rate of deformation of at least 10,000%/min and a draw ratio of 2.7 to 3.5.

The rate of deformation referred to herein is calculated according to the following formula (II):

$$V_{MD} = \frac{(X-1)}{L} \times \frac{(U_L + U_H)}{2} \times 100 \qquad (II)$$

wherein $V_{MD}$ represents the rate of longitudinal deformation (%/min) of the film, X represents the draw ratio (times) determined by $U_H/U_L$, L represents the length (m) of the longitudinal drawing section, $U_L$ represents the linear speed (m/min) of a low-speed roll, and $U_H$ represents the linear speed (m/min) of a high-speed roll.

If the rate of deformation ($V_{MD}$) is lower than 10,000%/min, lateral drawing unevenness is readily caused at the subsequent lateral drawing step even though the longitudinal drawing is efficiently carried out. On the other hand, if the rate of deformation is at least 10,000%/min, the longitudinal drawing is performed in good conditions and no lateral drawing unevenness is caused in the film at the lateral drawing step. The upper limit of the rate of deformation may be appropriately selected according to the structure of the apparatus used and the film temperature at the time of starting the drawing, but it is ordinarily preferred that the rate of deformation be up to 50,000%/min.

It is preferred that when the film temperature at the time of starting the drawing is low, the rate of deformation be lower within the above-mentioned range and that if the film temperature is high, the rate of deformation be higher within the above-mentioned range.

If the longitudinal draw ratio is lower than 2.7, no desirable orientation can be given to the finally obtained film. If the longitudinal draw ratio is higher than 3.5, at the subsequent lateral drawing step, lateral drawing unevenness is readily caused and an undrawn portion is left, and the film is readily torn. The longitudinal draw ratio can be changed by changing the linear speeds of high-speed and low-speed rolls in the roll type drawing machine.

According to the process of the present invention, the film longitudinally drawn under the above-mentioned conditions is transferred to the position of starting of subsequent lateral drawing (i.e., the position where expansion of the width of the film is started by tenter rails) at a temperature adjusted to 45° C. to 60° C. within a time represented by the following formula (I):

$$t = e^{(3.9 - 0.053 T_1)} \qquad (I)$$

wherein e represents the base of the natural logarithm, t represents the time (seconds) between the point of termination of the drawing in the longitudinal direction and the point of starting of the drawing in the lateral direction, and $T_1$ represents the temperature of the film during this period of time, which is selected within the range of from 45° to 60° C.

The reason why the film temperature is adjusted to 5° to 60° C. after termination of the longitudinal drawing is as follows. If the film temperature is lower than 45° C., the film is readily broken at the lateral drawing because of the too low temperature. If the film temperature is higher than 60° C., since the time of transfer to the position of starting of the lateral drawing after termination of the longitudinal direction becomes very short, it is necessary to drastically shorten the distance between the longitudinal drawing machine and the lateral drawing machine of drastically shorten the film-introducing portion (the portion for gripping the film) of the lateral drawing machine, and problems arise with respect to the design and arrangement of the apparatus or operation adaptability.

If the rate of deformation is higher than 5,000%/mir at the drawing step, heat is generated during the drawing and the film temperature is elevated slightly (by 10° C. to 20° C.). Accordingly, it sometimes becomes necessary to cool the film to adjust the film temperature within the range of from 45° C. to 60° C.

The longitudinally drawn film is transferred to the subsequent lateral drawing step. Since the rate of crystallization is high in the case of a polyamide, the hydrogen bond in the drawn film becomes strong with the lapse of time. Accordingly, it is difficult to adopt a method in which the longitudinally drawn film is quenched and heated again to a drawable temperature in the preheating zone of the lateral drawing machine, and it is necessary to transfer the film in a very short time at a drawable temperature as low as possible while inhibiting the hydrogen bond from becoming strong.

From the results of experiments we made, it was found that good results can be obtained if the longitudinally drawn film is transferred to the subsequent lateral drawing step within a time calculated according to the above formula (I). More specifically, it was found that, where the temperature of the film adjusted after termination of the lateral drawing is 45° C., that time t should be within 4.5 seconds, in the case of 50° C., the time t should be within 3.5 seconds, and in the case of 60° C., the time t should be within 2.1 seconds. If the time is longer than the value calculated according to the formula (I), lateral drawing unevenness is readily caused in the film at the subsequent lateral drawing step, or an undrawn part is left in the side end portions of the film with respect to the lateral direction.

According to the process of the present invention, the longitudinally drawn film is transferred to the lateral drawing step, and the thickness profile of the film at the position of starting of the lateral drawing is gradually reduced from the side end portions (i.e., tenter clip holding portions) with respect to the lateral direction toward the central portion with respect to the lateral direction so that the thickness of the film at the central portion with respect to the lateral direction is 75 to 90% of the thickness of the film at the side end portions.

The reason why the thickness profile of the film at the position of starting of the lateral drawing is adjusted in the above-mentioned manner is that the occurrence of necking in the vicinity of the tenter clip is thereby controlled so as to avoid breakage of the film) and the position of the occurrence of necking drawing in the central portion of the film with respect to the lateral direction is made random (namely, the position of the occurrence of necking drawing is not set, so that formation of a specific set thickness profile in the drawn film is prevented).

Figure 2:
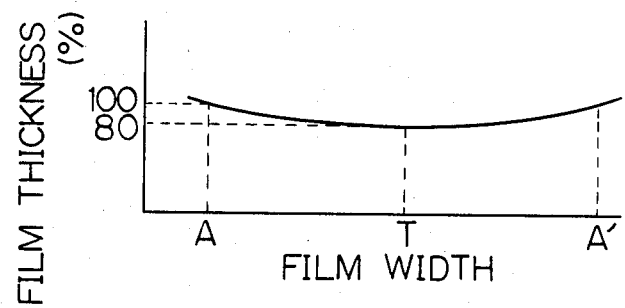
FIGS. 2 and 3 show the thickness profile of the film at the position of starting of the lateral drawing according to the process of the present invention, wherein the lateral direction of the film is plotted on the abscissa and the thickness (%) of the film is plotted on the ordinate.
Figure 3:
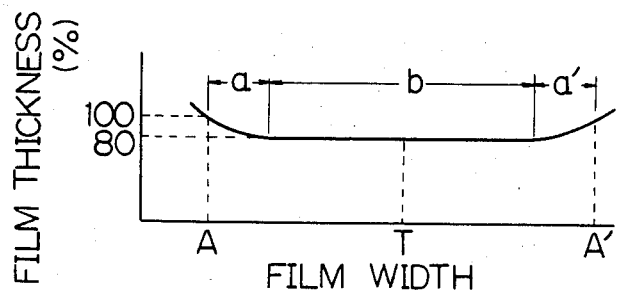

A preferred thickness profile of the film at the position of starting of the lateral drawing is illustrated in FIGS. 2 and 3. In each of FIGS. 2 and 3, the lateral direction of the film is plotted on the abscissa and the thickness (%) of the film is plotted on the ordinate.

Figure 4:
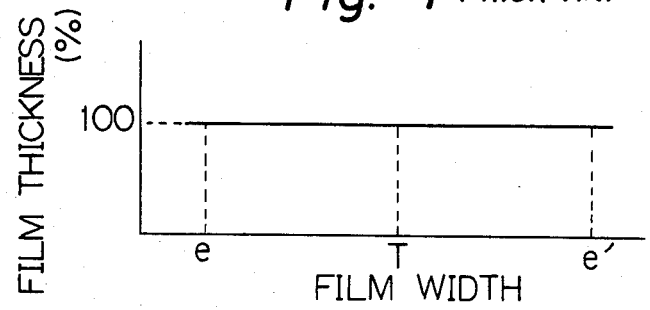
FIGS. 4 and 5 show the thickness profile at the position of starting of the lateral drawing according to the process other than the process of the present invention, wherein the lateral direction of the film is plotted on the abscissa and the thickness (%) of the film is plotted on the ordinate.
Figure 5:
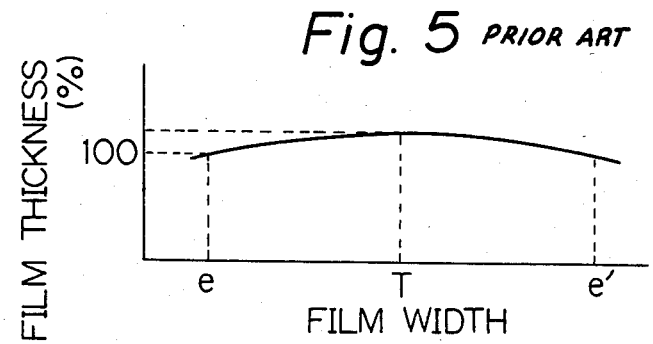

From the results of experiments we made, it was confirmed that the thickness profile of the longitudinally drawn film depends on the thickness of the product, the distance between tenter clips and other factors, and is as shown in FIGS. 2 through 5 (the meanings of the abscissa and ordinate in FIGS. 4 and 5 are the same as in FIGS. 2 and 3). Furthermore, it was found that films having a thickness profile as shown in FIG. 4 or 5 are not preferred because necking drawing is readily caused in the vicinity of the tenter clip.

If the thickness of the film in the central portion with respect to the lateral direction exceeds 90% of the thickness of the film in the side end portions (i.e., tenter clip holding portions) of the film with respect to the lateral direction, the thickness profile of the film is as shown in FIG. 4, and necking drawing is caused in the vicinity of the tenter clip and a specific set thickness profile is produced in the finally obtained film. If the thickness of the film in the central portion with respect to the lateral direction is smaller than 75% of the thickness of the film in the side end portions (i.e., tenter clip portions) with respect to the lateral direction, a portion which is not completely laterally drawn (hereinafter referred to as "undrawn part") is formed in the vicinity of the tenter clip and the yield of the product is reduced.

Furthermore, it was found that when it is intended to produce a thickness profile of the film as shown in FIG. 3, it is preferred that the values of a and a' be at least 50 mm.

According to the process of the present invention, at the step of lateral drawing by the tenter type lateral drawing method, before the mechanically set draw ratio between tenter clips exceeds 1.4 times the original distance, the film is expanded at an angle of up to 6° with respect to the central line in the lateral direction of the film and the tenter clip temperature $T_2$ is adjusted to a level satisfying the condition of $T_2 < T_1$.

The reason why the conditions just after starting of the lateral drawing are adjusted in the above-mentioned manner is that the occurrence of necking in the vicinity of the tenter clip is prevented thereby, to avoid breakage of the film, and further, that the position of the occurrence of neck drawing in the central portion with respect to the lateral direction of the film is made random (namely, the position of the occurrence of necking drawing is not set, so that formation of a specific set thickness profile in the finally obtained film is prevented).

Figure 6:
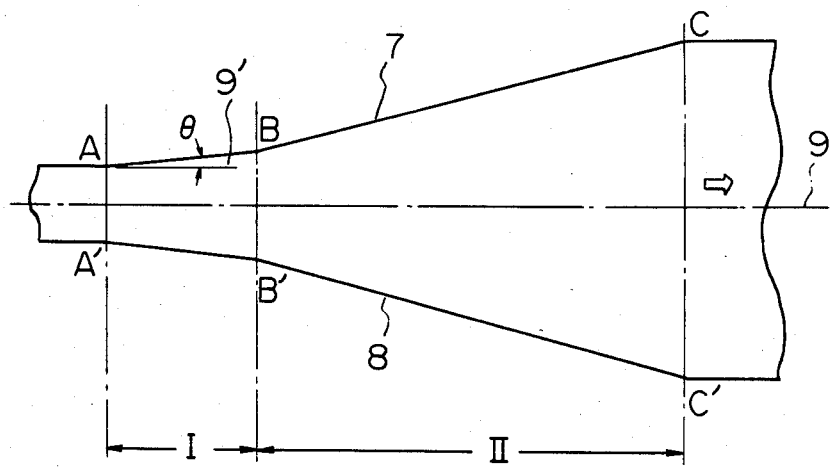
FIG. 6 is a diagram illustrating the state of expansion of the width of the film at the lateral drawing step according to the process of the present invention.
Figure 7:
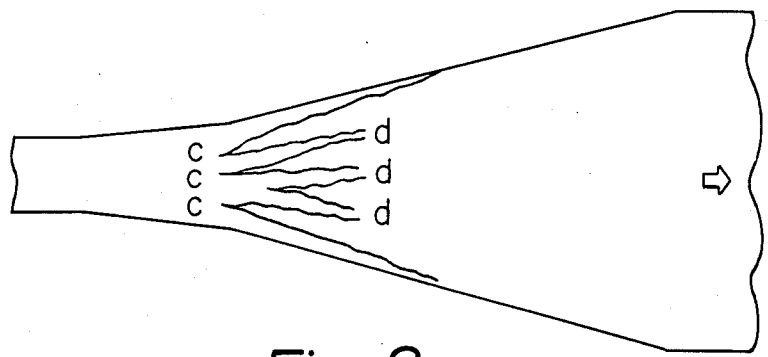
FIG. 7 is a diagram illustrating the state of necking drawing caused in the film at this lateral drawing step.
Figure 8:
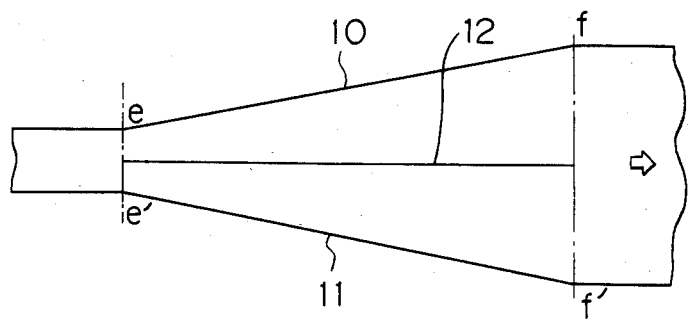
FIG. 8 is a diagram illustrating the state of expansion of the width of the film at the lateral drawing step according to the conventional process and FIG. 9 is a diagram illustrating the state of necking drawing caused in the film at this lateral drawing.
Figure 9:
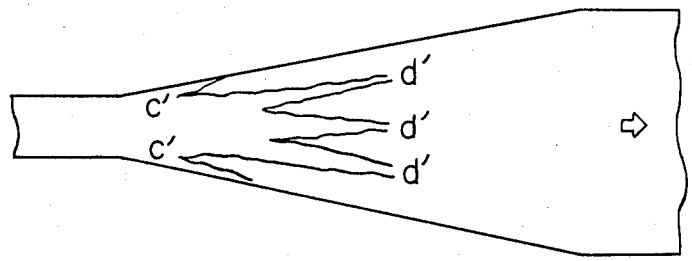
Figure 10:
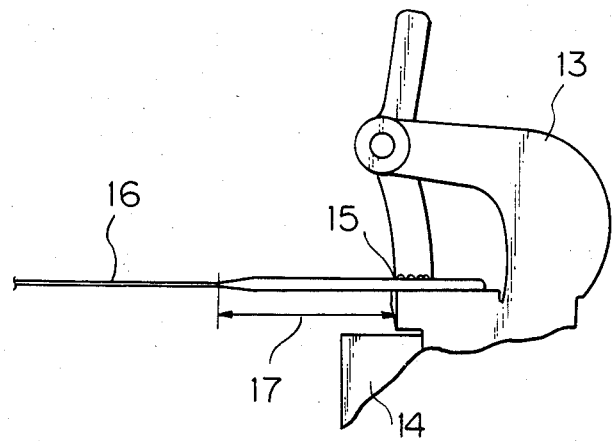
FIG. 10 is a longitudinally sectional side view showing an example of the side end portion of the film with respect to the lateral direction (i.e., tenter clip holding portion) in the conventional process.

In FIG. 6 and FIG. 7, the state where the film is expanded at the lateral drawing step according to the process of the present invention, and the state of necking drawing caused at this lateral drawing are illustrated, respectively. In FIG. 8 and FIG. 9, the state where the film is expanded at the lateral drawing step according to the conventional process, and the state of necking drawing caused at this lateral drawing are illustrated, respectively. In FIG. 10, an example of the side end portion (i.e., tenter clip portion) with respect to the lateral direction of the film in the conventional process is illustrated. In these drawings, each of reference numerals 7, 8, 10 and 11 represents a tenter rail each of reference numerals 9 and 12 represents the central line of the film, reference numeral 9' represents a line parallel to the central line of the film, reference numeral 14 represents a side plate of the tenter rail, reference numeral 15 represents a holding portion of the tenter clip, reference numeral 16 represents a drawn film, reference 17 represents an undrawn part, symbols A, A' and e, e' represent the position of starting of the lateral drawing, B and B' represent the position where the mechanically set draw ratio between tenter clips exceeds 1.4 times the original clearance, C, C' and f, f' represent the position of termination of the lateral drawing, θ indicates the angle of expansion to the central line in the lateral direction of the film, c and c' indicate the point of the occurrence of necking drawing, d and d' indicate the point of the disappearance of necking drawing, and arrows indicate the direction of the transfer of the film.

According to experiments we made, it was confirmed that according to the conventional process, as shown in the diagram of FIG. 8, the tenter rails 10 and 11 are expanded in the form resembling an unfolded fan and, therefore, a difference of the deformation course length of the film is produced between the clip holding portions ef and e'f'; that is, end portions with respect to the lateral direction of the film, and the central portion 12. Because of this difference, "shear deformation" becomes greater at a point closer to the tenter clip, and points c' of the occurrence of necking drawing readily appear in the vicinity of the tenter clips, as shown in FIG. 9.

If the point of the occurrence of necking drawing is too close to the tenter clip, necking immediately reaches at the tenter clip and the thickness of the film is reduced at the holding portions of the tenter clip, and breakage of the film is caused from these portions. Where the film is not broken, the points d' of the disappearance of necking drawing are shifted downstream of the tenter, and lateral drawing unevenness is not observing in the finally obtained film, and thus it seems that the film is uniformly drawn. However, even in this case, it was found that the thickness is increased at portion corresponding to the points d' of the disappearance of necking drawing, and a film having excellent flatness cannot be obtained.

Moreover, it was found that if a longitudinally drawn film in which the thickness of the central portion is considerably smaller than the thickness of the side end portions (i.e., tenter clip holding portions) with respect to the lateral direction of the film is drawn in the lateral direction at the lateral drawing step, as shown in the cross sectional view of FIG. 10, in the side end portions with respect to the lateral direction of the film, both a drawn part 16 and an undrawn part 17 are formed. If the width of the undrawn part 17 is not larger than 10 mm, it can be said that the product film is substantially completely drawn, but if the width exceeds 10 mm, it cannot be said that the product film is completely drawn.

These defects can be eliminated according to the process of the present invention. It was found that if the film is expanded at an angle θ of up to 6° to the central line in the lateral direction of the film in the section before the width of the laterally drawn film exceeds 1.4 times the original width (section I in FIG. 6), necking is not caused in the vicinity of the tenter clip. Namely, if the thickness profile of the longitudinally drawn film is adjusted as described above and the mechanical set ratio between the tenter clips and the film expansion angle are adjusted as describe above, the points c of the occurrence of necking drawing can be made random and drawing can be performed stably, and a film having excellent flatness can be obtained.

In the section I shown in FIG. 6, the tenter clip temperature $T_2$ should satisfy the condition of $T_2 < T_1$. In the process of the present invention, since expansion of the width is carried out at a relatively low temperature in the section I shown in FIG. 6 so as to control crystallization, the drawing stress is relatively large and the stress is especially concentrated on the tenter clips. Therefore, if the film temperature in this portion is high, breakage of the film takes place at the tenter clips. The above temperature conditions is adopted to prevent this breakage of the film.

As pointed out above, in the section I shown in FIG. 6, expansion of the width is effected under specific conditions, and in the subsequent section II, expansion of the width is preferably carried out at an angle θ of at least 6°. The mechanically set pattern between the tenter clips in this section II is not particularly critical, but since necking drawing is caused in the section I, it is preferred that the expansion angle θ be as large as possible. If the expansion angle in the section II is large, points d of the disappearance of necking drawing appear relatively promptly without shifting downstream of the tenter, and a film having excellent flatness and a reduced proportion of undrawn parts can be obtained.

At the step of the lateral drawing by the tenter, it is necessary to elevate the film temperature stepwise from the position of starting the lateral drawing so that the film temperature at the position of termination of the lateral drawing is 70° C. to 100° C., preferably 75° C. to 90° C.

Since the hydrogen bond having a directionality in the drawn direction becomes strong with the lapse of time in the film longitudinally drawn according to the above-mentioned procedures, the film is transferred to the position of starting the lateral drawing within a very short time and the lateral drawing is started. The film temperature of 45° C. to 60° C. at this starting point is too low for the lateral drawing. If the lateral drawing is carried out at this temperature, the film is readily broken by the tenter clips in the section II shown in FIG. 6, and it is difficult to perform the lateral drawing stably.

In order to perform the lateral drawing stably and obtain a film having a relatively balanced longitudinal orientation, the film is laterally drawn while elevating the film temperature stepwise. This feature is important as well as the above-mentioned feature that a specific thickness profile as described above is given to the film to be subjected to the lateral drawing and the expansion of the width by the tenter clips at the initial stage of the lateral drawing is carried out at a specific angle so that the points of starting of necking drawing caused in the central portion with respect to the lateral direction of the film are made random. When the temperature is abruptly elevated at the lateral drawing, the portion in which necking drawing is to caused yet, that is, the portion in which the lateral drawing is not caused yet, receives a strong heat. Therefore, the hydrogen bond having a directionality, generated at the longitudinal drawing step, becomes strong. If this film is laterally drawn, lateral drawing unevenness is caused or an undrawn part is formed. To avoid this disadvantage, the draw ratio of the lateral drawing should be drastically increased, with the results that a film in which the orientation in the lateral direction is not balanced with the orientation in the longitudinal direction is obtained.

From experiments we made, it was found that, if at the step of laterally drawing the film by the tenter, the film temperature is elevated stepwise from the position of starting of the lateral drawing so that the film temperature at the point of termination of the lateral drawing is 70° C. to 100° C., preferably 75° C. to 90° C., the hydrogen bond is inhibited from becoming strong, and as shown in FIG. 7, points d of the disappearance of necking drawing can be caused to appear at the early stage of the later drawing step, with the results that a film having a well-balanced orientation and a high thickness uniformity can be stably prepared.

As means for elevating the film temperature stepwise at the lateral drawing step, a method may be adopted in which at least two sections are formed at right angles to the direction of the transfer of the film above and/or below the film and hot air is blown into each section or an infrared heater is arranged in each section. Hot air blowing and infrared heating may be carried out in combination.

The film temperature at the point of termination of the lateral drawing is preferably adjusted within the range of from 70° C. to 100° C. Where the rate of deformation of the film is high and the draw ratio is high, a relatively higher film temperature is selected within this range. In contrast, if the rate of deformation is low and the draw ratio is low, a relatively lower film temperature is selected within this range.

At the lateral drawing step, it is necessary to adopt drawing conditions such that the average rate of deformation is 2,000 to 10,000%/min and the draw ratio is 3 to 5, preferably 3.5 to 4.5.

The rate of deformation referred to herein is calculated according to the following formula (III):

$$V_{TD} = \frac{(Y-1)}{L_T} \times U_T \times 100 \qquad (III)$$

wherein $V_{TD}$ represents the lateral rate of deformation (%/min) of the film, Y represents the mechanically set draw ratio (times) of the film, which is determined by $y_2/y_1$, $y_1$ being the width between the tenters at the position of starting of the lateral drawing (A and A' in FIG. 6) and $y_2$ being the width between the tenters at the position of termination of the lateral drawing (C and C' in FIG. 6), $U_T$ represents the tenter speed (m/min), and $L_T$ represnts the length (m) of the lateral drawing section (i.e., the length between the position A, A' and the position C, C' in FIG. 6).

If the average rate of deformation (VTE is lower than 2,000%/min, lateral drawing unevenness is readily caused in the film. If the average rate of deformation is higher than 10,000%/min, the film is readily broken.

If the draw ratio of the lateral drawing is lower than 3, an undrawn part is readily formed. If the draw ratio exceeds 5, breakage is readily caused in the laterally drawn film.

In order to impart good dimensional stability to the biaxially drawn polyamide film prepared according to the above-mentioned process, it is preferred that the film be subjected to a heat treatment (or heat-setting) according to customary procedures. For example, the heat treatment is preferably carried out at a temperature higher than 130° C. but lower than the melting point of the polyamide, within 5 minutes, especially within 1 minute. The heat treatment may be carried out in the state where the film is under tension or under relaxation. Moreover, the heat treatment under tension and the heat treatment under relaxation may be carried out in combination.

The relaxation ratio is not particularly critical, but in the process of the present invention, the relaxation ratio is preferably selected within the range of from 3 to 7%.

As is apparent from foregoing description, according to the process of the present invention, since the film is drawn in the longitudinal direction and in the lateral direction while controlling crystallization, a film having an excellent orientation balance can be obtained. Moreover, according to the process of the present invention, since necking drawing is caused in the central portion of the film with respect to the lateral direction at the lateral drawing step and necking drawing is caused to disappear at a relatively early stage of the lateral drawing step, a film having no thickness unevenness, a high thickness precision, and an excellent levelness can be stably prepared.

The present invention will now be described in detail with reference to the following examples that by no means limit the scope of the invention.

EXAMPLE 1

Poly-ε-caproamide having a relative viscosity of 3.5 (Novamid 1020CA supplied by Mitsubishi Chem. Ind.) was melted and kneaded in an extruder having a screw diameter of 90 mm at a cylinder temperature of 260° C., extruded in the form of a film through a T-die and quenched on a casting roll having a diameter of 600 mm, which was cooled at 35° C., to obtain a substantially amorphous undrawn film having a thickness of about 145 μm and a width of about 350 mm.

The undrawn film was guided at a transfer speed of 7 m/min to a longitudinal drawing machine comprising a plurality of rolls having a diameter of 150 mm and a width of 700 mm, where the film was heated at 45° C. and was longitudinally drawn between rolls differing in the peripheral speed at a rate of deformation of 10,900%/min and a draw ratio of 2.9.

By rolls arranged subsequently to the longitudinal drawing zone, the temperature of the longitudinally drawn film was adjusted to 45° C. and transferred to the position of starting of the lateral drawing in a tenter type lateral drawing machine having a width of 1.5 m and a length of 20 m within 4.5 seconds while maintaining the above temperature.

The thickness of the film transferred to this position was 59 μm in the clip holding portions and 50 μm in the central portion with respect to the lateral direction of the film, and the thickness in the central portion was 85% of the thickness in the clip holding portions.

The tenter clip of the tenter type lateral drawing machine had a structure in which cooling water was circulated through a water-cooling pipe cast and laid out in a tenter rail and the lateral drawing zone was equidistantly divided into three sections. A hot air blow nozzle was arranged in each section so that the temperature could be independently adjusted in the three sections.

Both side ends of the longitudinally drawn film were held by tenter clips cooled to 40° C., and the tenter rails were expanded by an angle of 5° to the central line with respect to the lateral direction of the film to the position where the mechanically set draw ratio is 2.0 and the lateral drawing was carried out at an average rate of deformation of 2,000%/min and a draw ratio of 3.5. In the heating zone, the temperatures of the first, second and third sections were 60° C., 70° C. and 75° C., respectively.

The laterally drawn film was heat-treated at 200° C. for 3 seconds under a constant width while the film was held by the tenter clips, at 200° C. for 3 seconds in the state relaxed by narrowing the clip distance by 5% and at 200° C. for 3 seconds under a constant width, that is, three times as a whole. Both the selvedges of the film were cut off, and the heat-treated film was wound by a winder to obtain a biaxially drawn film having a thickness of 15 μm.

The preparation of the film according to the above-mentioned process could be continuously carried out for 5 hours smoothly and conveniently without breakage of the film.

The conditions for the preparation of the film and the drawing state of the film are shown in Table 1.

The physical properties of the obtained film were determined and evaluated according to methods described below. The obtained results are shown in Table 2.

(1) Thickness (μm) of film

The thickness was measured at intervals of 30 mm in the lateral direction of the film and the mean value was calculated.

(2) Thickness Unevenness (%) of Film

The thickness unevenness was calculated according to the following formula:

$$\text{Thickness unevenness} = \frac{MAT - MIT}{AVT} \times 100$$

wherein
MAT represents the maximum thickness in the lateral direction, MIT represents the minimum thickness in the lateral direction, and AVT represents the average thickness in the lateral direction.

If the thickness flatness is smaller than 10%, it may be said that the thickness precision is high.

(3) Flatness

As shown in FIG. 1, parallel base lines 2 and 3 having 2 m distance were drawn on a flat table 1. A film having a length of 3 m was spread on the table 1 and one end thereof was fixed on the base line 2 by an adhesive tape 4. A load of 20 g per cm of the film width was imposed on the other end of the film to stretch the film and a bench mark 6 was drawn on the film according to the base line 3 on the table 1. Then, the load was removed and cut lines 5 were formed along the longitudinal direction of the film at intervals of 3 cm throughout the width of the film to form strips. A load of 60 g was imposed on the free end of each strip. Deviations of bench marks 6 on the respective strips from the base line 3 on the table were measured. The levelness was evaluated by the difference between the maximum and minimum deviations as the criterion.

If this criterion is less than 2 mm, the film can be practically used without any problem, but it is preferred that the criterion be smaller than 1.5 mm.

(4) Actually Measured Draw Ratio

A circle having a diameter of 30 mm was drawn on an undrawn film with a felt pen, and the lengths of the circle in the longitudinal direction and lateral direction before and after the drawing operation were measured. Ratios between the obtained values were used as the actually measured draw ratios in the longitudinal and lateral directions.

(5) Orientation Balance Index and Planar Orientation Index

The refractive index x of the film in the longitudinal direction, the refractive index y of the film in the lateral direction and the refractive index z of the film in the thickness direction were measured by using an Abbe refractometer. The orientation balance index and planar orientation index were calculated according to the following formulae:

$$\text{Orientation balance index} = \phi x - y \phi$$

$$\text{Planar orientation index} = \frac{x + y}{2} - z$$

(6) Tensile Strength at Break and Tensile Elongation at Break

A specimen having a width of 10 mm and a length of 100 mm was taken out from the sample film. The tensile strength at break and tensile elongation t break of the specimen were measured by using an autograph (Model DSS-2000 supplied by Shimazu Corp.) under conditions of a chuck distance of 50 mm, a pulling speed of 50 mm/min, an ambient temperature of 25° C. and a relative humidity of 40%.

(7) Hot Water Shrinkage Factor (%)

A square specimen having a side of 100 mm was cut out from the sample film and placed in an atmosphere maintained at a temperature of 25° C. and a relative humidity of 40%. Bench marks were drawn at intervals of 80 mm. The specimen was immersed in hot water for 5 minutes, taken out from hot water and allowed to stand in an atmosphere maintained at a temperature of 25° C. and a relative humidity of 40% for 24 hours. The change ($\Delta l_1$) of the length between the bench marks was measured and the hot water shrinkage factor was calculated according to the following formula:

$$\text{Hot water shrinkage factor (\%)} = \frac{\Delta l_1}{80} \times 100$$

(8) Pinhole-Resistant Strength (g)

A circular frame having an inner diameter of 100 mm was attached to an autograph (Model DSS-2000) and the sample film was secured in the stretched state in the frame. A needle having a top end having a spherical surface having a diameter of 0.5 mm was attached to a load cell of an autograph head through a metal rod. A crosshead was moved at a rising speed of 50 m/min to stick the needle into the film, and the strength (g) at which the film was broken was measured.

EXAMPLES 2 and 3

An undrawn film was prepared from poly-ε-caproamide having a relative viscosity of 3.5 (Novamid 1020CA supplied by Mitsubishi Chem. Ind.) in the same manner as described in Example 1.

The undrawn film was longitudinally drawn under conditions described in Table 1 by using the same longitudinal drawing machine as used in Example 1.

The longitudinally drawn film was transferred to the position of starting of the lateral drawing under conditions described in Table 1 and was laterally drawn under conditions as described in Table 1 by using the same tenter type lateral drawing machine as used in Example 1.

The laterally drawn film was heat-treated at 200° C. under a constant width for 2.4 seconds, at 200° C. in the state relaxed by narrowing the clip distance by 7% for 2.4 seconds and at 200° C. under a constant width for 2.4 seconds.

The heat-treated film was wound by a winder after cutting off both the selvedges.

The physical properties of the obtained film were determined according to the methods described in Example 1. The obtained results are shown in Table 1.

EXAMPLES 4 through 8

By using the same material as used in Example 1, an undrawn film was prepared in the same manner as described in Example 1.

A drawn film was prepared from the undrawn film under conditions described in Table 1 by using the same drawing apparatus as used in Example 1.

In each example, even though the preparation of a drawn film was carried out continuously for 5 hours according to the above-mentioned process, the operation could be performed smoothly and stably without breakage of the film.

COMPARATIVE EXAMPLES 1 through 12

By using the same material as used in Example 1, an undrawn film was prepared in the same manner as described in Example 1.

A drawn film was prepared from the undrawn film under conditions described in Table 1 by using the same drawing apparatus as used in Example 1.

The state of the film during the drawing is shown in Table 1.

TABLE 1

| | Longitudinal drawing conditions | | | Transfer conditions | | Film thickness at inlet of lateral drawing zone Ratio (%) of thickness in central portion to thickness (%) | Laterally drawing conditions | | | | | | | | | |
|---|---|---|---|---|---|---|---|---|---|---|---|---|---|---|---|---|
| | Temperature (°C) | Deformation speed (%/min) | Set draw ratio (times) | Temperature (T₁) (°C) | Transfer time (seconds) | | Clip temperature (T₂) (°C) | Initial Expansion by rails | | Section 1 Temperature (°C) | Section 2 Temperature (°C) | Section 3 Temperature (°C) | Average rate of deformation (%/min) | Set draw ratio (times) | State of film at drawing |
| | | | | | | | | Angle (degrees) | Position (times) | | | | | | |
| Example 1 | 45 | 10,900 | 2.9 | 45 | 4.5 | 85 | 40 | 5 | 2.0 | 60 | 65 | 75 | 2,000 | 3.5 | |
| Example 2 | 50 | 14,700 | 3.1 | 50 | 3.5 | 82 | 40 | 4 | 1.9 | 60 | 70 | 80 | 3,000 | 4.5 | Breakage was not caused during drawings and no drawing unevenness was caused in film. |
| Example 3 | 55 | 16,800 | 3.3 | 45 | 4 | 82 | 40 | 5 | 1.5 | 65 | 75 | 85 | 3,250 | 4.9 | |
| Example 4 | 45 | 30,600 | 3.2 | 45 | 3 | 82 | 40 | 6 | 1.6 | 70 | 75 | 85 | 7,000 | 4.5 | |
| Example 5 | 50 | 29,400 | 3.1 | 45 | 3 | 82 | 40 | 5 | 1.5 | 65 | 70 | 80 | 6,000 | 4.0 | |
| Example 6 | 55 | 28,300 | 3.0 | 50 | 3 | 88 | 40 | 5 | 2.0 | 70 | 75 | 85 | 7,000 | 4.5 | |
| Example 7 | 60 | 29,400 | 3.1 | 50 | 2 | 78 | 40 | 5 | 1.5 | 70 | 80 | 90 | 7,800 | 4.9 | |
| Example 8 | 65 | 41,200 | 3.1 | 60 | 2 | 82 | 40 | 5 | 1.5 | 75 | 85 | 95 | 9,600 | 4.5 | |
| Comparative Example 1 | 42 | 14,700 | 3.1 | 45 | 4.5 | 80 | 40 | 5 | 2.0 | 60 | 65 | 70 | 2,000 | 4.5 | Longitudinal drawing unevenness |
| Comparative Example 2 | 50 | 9,100 | 3.2 | 45 | 4 | 82 | 40 | 4 | 1.9 | 50 | 50 | 50 | 3,000 | 4.5 | Lateral drawing unevenness |
| Comparative Example 3 | 45 | 14,700 | 3.1 | 45 | 4 | 82 | 40 | 4 | 1.9 | 85 | 85 | 85 | 3,000 | 4.5 | Frequent breakage during lateral drawing |
| Comparative Example 4 | 45 | 14,700 | 3.1 | 45 | 4 | 82 | 40 | 4 | 1.9 | 60 | 70 | 80 | 3,000 | 4.5 | Lateral drawing unevenness |
| Comparative Example 5 | 50 | 14,700 | 3.1 | 45 | 4 | 82 | 40 | 4 | 1.8 | 60 | 70 | 80 | 3,000 | 4.5 | Undrawn part formed. |
| Comparative Example 6 | 45 | 14,700 | 3.1 | 45 | 4 | 80 | 40 | 7 | 1.3 | 60 | 70 | 80 | 3,000 | 4.5 | Frequent breakage during lateral drawing |
| Comparative Example 7 | 50 | 14,700 | 3.1 | 50 | 3.5 | 80 | 40 | 3 | 1.3 | 65 | 70 | 80 | 3,000 | 4.5 | Frequent breakage during lateral drawing |

TABLE 1-continued

| | Longitudinal drawing conditions | | | Transfer conditions | | Film thickness at inlet of lateral drawing zone Ratio (%) of thickness in central portion to thickness (%) | Laterally drawing conditions | | | | | | | | | |
|---|---|---|---|---|---|---|---|---|---|---|---|---|---|---|---|---|
| | Temperature (°C.) | Deformation speed (%/min) | Set draw ratio (times) | Temperature (T₁) (°C.) | Transfer time (seconds) | | Clip temperature (T₂) (°C.) | Initial Expansion by rails | | | Section 1 Temperature (°C.) | Section 2 Temperature (°C.) | Section 3 Temperature (°C.) | Average rate of deformation (%/min) | Set draw ratio (times) | State of film at drawing |
| | | | | | | | | Angle (degrees) | Position (times) | | | | | | | |
| Comparative Example 8 | 55 | 41,200 | 3.1 | 50 | 2 | 82 | 40 | 5 | 2.0 | 70 | 80 | 90 | 11,000 | 5.1 | Frequent breakage during lateral drawing |
| Comparative Example 9 | 50 | 29,400 | 3.1 | 45 | 3 | 82 | 55 | 5 | 1.5 | 65 | 70 | 80 | 6,000 | 4.0 | Frequent breakage during lateral drawing |
| Comparative Example 10 | 45 | 14,700 | 3.1 | 45 | 4 | 95 | 40 | 5 | 1.5 | 65 | 75 | 80 | 3,000 | 4.5 | Frequent breakage during lateral drawing |
| Comparative Example 11 | 50 | 21,000 | 3.6 | 50 | 3 | 80 | 40 | 5 | 1.5 | 65 | 75 | 85 | 3,500 | 4.0 | Frequent breakage during lateral drawing |
| Comparative Example 12 | 70 | 14,700 | 3.1 | | | | | | | | | | | | Sticking to rolls and longitudinal drawing unevenness |

TABLE 2

| | | Example 1 | Example 2 | Example 3 |
|---|---|---|---|---|
| Thickness (μm) | | 15 | 15 | 15 |
| Thickness unevenness (%) | | 10 | 8 | 8 |
| Flatness (mm) | | 1.2 | 1.6 | 1.6 |
| Actually measured draw ratio (times) | longitudinal | 2.9 | 3.1 | 3.3 |
| | lateral | 3.0 | 3.1 | 3.3 |
| Orientation balance index | | 0.004 | 0.002 | 0.003 |
| Planar orientation index | | 0.060 | 0.061 | 0.062 |
| Tensile strength at break (kg/mm²) | longitudinal | 28.0 | 28.2 | 28.2 |
| | lateral | 28.4 | 28.4 | 28.5 |
| Tensile elongation at break (%) | longitudinal | 96 | 93 | 73 |
| | lateral | 90 | 90 | 71 |
| Hot water shrinkage factor % | longitudinal | 2.5 | 3.0 | 3.2 |
| | lateral | 3.0 | 2.9 | 3.0 |
| Pinhole-resistant strength (g) | | 650 | 640 | 600 |

From data shown in Tables 1 and 2, the following can be seen.

(1) According to the process of the present invention, breakage of the film is not caused during the drawing, and the preparation of the film can be conducted continuously for a long time.

(2) According to the process of the present invention, "uneven tightening phenomenon", drawing unevenness or formation of undrawn parts is not caused in the obtained biaxially drawn film, and a product having a good appearance can be obtained.

(3) A film having an excellent surface flatness, a reduced thickness unevenness and physical properties well-balanced in the longitudinal and lateral directions can be obtained.

(4) In contrast, when the process of the present invention is not adopted, drawing becomes impossible in the midway because of breakage of the film. Even if drawing is possible, drawing unevenness is caused and undrawn parts are formed in the film, and only a product having poor appearance is obtained.

We claim:

1. A process for the preparation of a biaxially drawn polyamide film, which comprises: drawing a substantially amorphous unoriented polyamide film in the longitudinal direction at a temperature of 45° C. to 65° C., a rate of deformation of at least 10,000% /min and a draw ratio of 2.7 to 3.5 by a roll type longitudinal drawing method to form a longitudinally drawn film; transferring the longitudinally drawn film to a position of starting the drawing in the lateral direction at a temperature adjusted to 45° C. to 60° C., within a time represented by formula (I):

$$t = e^{(3.9 - 0.053 T_1)} \quad (I)$$

wherein e represents the base of the natural logarithm, t represents the time in between the point of termination of the drawing in the longitudinal direction and the point of starting of the drawing in the lateral direction, and $T_1$ represents the temperature of the film during this period of time, which is within the range of from 45° C. to 60° C., the thickness profile of the longitudinally drawn film at said position of starting the drawing in the lateral direction, is gradually reduced from the side end portions (tenter clip holding portions) with respect to the lateral direction, toward the central portion with respect to the lateral direction, so that the thickness of the film at the central portion with respect to the lateral direction is 75 to 90% of the thickness of the film at the side end portions with respect to the lateral direction; and drawing the longitudinally drawn film in the lateral direction at an average rate of deformation of 2,000 to 10,000%.min and a draw ratio of 3 to 5 by a tenter type lateral drawing method wherein, until the mechanically set draw ratio between respective tenter clips exceeds 1.4 times the orginal distance, the film is expanded at an angle not greater than 6° with respect to the center line, in the lateral direction of the film, at a tenter clip temperature $T_2$ satisfying the condition $T_2 < T_1$, the film temperature being elevated stepwise from the position of starting the drawing in the lateral direction, to a film temperature at the position of termination of the drawing in the lateral direction, of from 70° C. to 100° C.

2. The process according to claim 1, wherein the heated polyamide film is drawn in the longitudinal direction at a rate of deformation not greater than 50,000%/min.

3. The process according to claim 1, wherein the film temperature at the positon of termination of the drawing in the lateral direction is within the range of from 75° C. to 90° C.

4. The process according to claim 1, wherein the film is drawn in the lateral direction at a draw ratio of 3.5 to 4.5.

5. The process according to claim 1, which further comprises heat-treating the biaxially drawn film at a temperature of at least 130° C. but lower than the melting point of the polyamide for a period of time not greater than 5 minutes.

* * * * *